Figure 1:
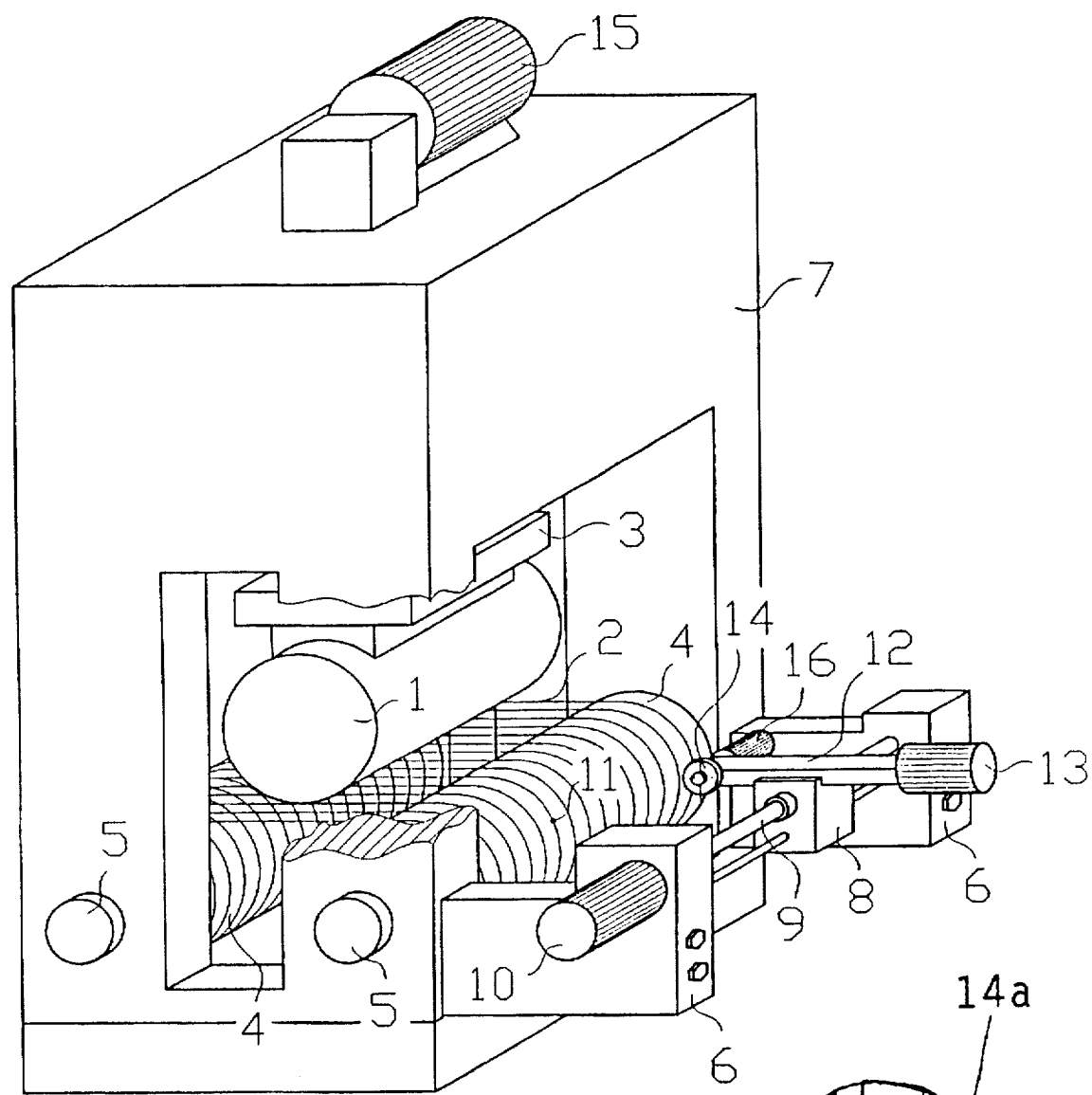

United States Patent [19]

Hauser

[11] Patent Number: 5,787,872
[45] Date of Patent: Aug. 4, 1998

[54] WIRE SAWING DEVICE

[75] Inventor: Charles Hauser, Genolier, Switzerland

[73] Assignee: HCT Shaping Systems SA, Cheseaux, Switzerland

[21] Appl. No.: 796,898

[22] Filed: Feb. 5, 1997

[30] Foreign Application Priority Data

Feb. 6, 1996 [CH] Switzerland ............... 301/96

[51] Int. Cl.$^6$ ............................................. B62D 1/547
[52] U.S. Cl. ......................................... 125/16.02; 125/21
[58] Field of Search .............................. 125/16.02, 16.01, 125/21; 83/651.1, 661, 809, 810; 451/415

[56] References Cited

U.S. PATENT DOCUMENTS

| | | | |
|---|---|---|---|
| 3,478,732 | 11/1969 | Clark et al. | 125/21 |
| 3,508,534 | 4/1970 | Bennefoy et al. | 125/21 |
| 5,377,568 | 1/1995 | Hauser | 83/651.1 |
| 5,575,189 | 11/1996 | Kiuchi et al. | 125/16.02 |
| 5,616,065 | 4/1997 | Egglhuber | 125/16.02 |

FOREIGN PATENT DOCUMENTS

| | | |
|---|---|---|
| 0 027 245 | 4/1981 | European Pat. Off. . |
| 0 712 677 | 5/1996 | European Pat. Off. . |
| 38 29 648 | 12/1989 | Germany . |
| 44 09 060 | 9/1995 | Germany . |
| 01-264764 | 10/1989 | WIPO . |

*Primary Examiner*—Robert A. Rose
*Attorney, Agent, or Firm*—Young & Thompson

[57] ABSTRACT

Sawing device comprising a layer of parallel wires (2) moving with alternating or continuous movement bearing against a piece (1) to be sawed fixed on a support table (3), the whole being maintained by a frame (7). The device comprises, removably or not, an in situ cutting mechanism for the grooves (11) on the surface of the wire guide cylinders (4) forming the support of the layer of wires (2). It is accordingly not necessary to dismount and withdraw the wire guide cylinders (4) from the frame (7) for the cutting operation of the grooves (11), which permits higher productivity and increased cutting precision.

11 Claims, 3 Drawing Sheets

WIRE SAWING DEVICE

This application corresponds to Swiss application 301/96 of Feb. 6, 1996, the disclosure of which is incorporated herein by reference.

The present invention relates to a wire sawing device comprising a layer of wires stretched between at least two wire guide cylinders and maintained in position by grooves on the surface of said wire guide cylinders which define the interval between the wires of said layer and adapted to move with an alternating or continuous movement while bearing against a piece to be sawed secured to a support table.

Sawing devices of this type are known, comprising among other things a layer of wires adapted to move with continuous or alternating movement bearing against a piece to be sawed defined thus a sawing zone. The sawing zone is constituted of an assembly of parallel cylinders. These cylinders, called wire guides, are engraved with grooves defining the interval between the wires of the layer, and hence the thickness of the sawed slices. The piece to be sawed is fixed on the support table which moves perpendicularly to the layer of wires. The speed of displacement defines the cutting speed. Renewal of the wire as well as control of its tension is carried out in a portion called a control zone of the wire located outside this sawing zone itself. The agent which causes the cutting is either an abrasive fixed to the wire, or a free abrasive through which the wire passes. The wire acts only as a carrier.

During cutting thin slices from the piece to be sawed, the stretched wire is both guided and tensioned by the wire guide cylinders. These cylinders, generally coated with a synthetic layer, are cut with grooves whose geometry and size must have a high precision. The cutting procedure which uses either a fixed or a free abrasive gives rise necessarily to wear of the material which constitutes the surface of the wire guide cylinders, and hence changes the dimensions and geometry of said grooves. These wire guide cylinders constitute the principal wear elements. These latter therefore have a limited lifetime and the grooves on their surface must be periodically re-cut either by grinding or by lathing. This operation is carried out away from the sawing device on a cylindrical grinder or on a numerically controlled turret for example. The number of re-cuttings depends on the magnitude of each cutting, on the geometry of the grooves and on the initial thickness of the coating. When the coating is completely used up, a new coating is applied by molding, injection or any method which proves to be adequate for the selected coating. When re-cutting seems necessary, the wire guide cylinders must be dismounted and withdrawn from the sawing device. This operation is generally difficult because of the mechanical complexity of the wire guide cylinders and their drive system. Moreover, this requires the assistance of outside handling. There results a substantial shutdown of the sawing device which decreases overall productivity of the assembly. For changing the thickness of the slices to be sawed, a change of the interval of the cut grooves on the surface of the wire guide is necessary and also requires changing the wire guide cylinders, which is not very practical and hardly desirable.

The precision of the slices, which is very important for electronic applications, depends on the position of the wires in the course of sawing as well as the support elements of the piece to be sawed, hence on the position of the wire guide cylinders relative to the piece to be sawed but also on the quality of the geometry of the grooves cut in the surface of the wire guides. Wear of these latter gives rise to loss of precision of the obtained slices. It is clear that stopping the sawing device for re-machining the grooves will be done only when entirely necessary; there is hence the tendency to use these as long as possible, thereby giving rise to a decrease in the average quality of the slices thus obtained.

Productivity and precision requirements of the applications for semiconductor use, connected to the increasing sizes of the pieces to be sawed and hence the slices, require that even small variations must be avoided. Re-cutting the grooves apart from the sawing device, given the difficulties that arise therefrom in view of the above requirements, require correspondingly high supplemental investments because it is necessary to have several sets of wire guide cylinders, which are costly because of their complexity and their precision.

The object of the present invention hence is to overcome the mentioned drawbacks, and the invention is characterized to this end by the fact that the sawing device comprises a mechanism for cutting the grooves on the surface of the wire guide cylinders permitting in situ cutting of the grooves without dismounting the wire guide cylinders.

These characteristics, using the concept of in situ cutting, permit providing a high performance sawing device having high productivity, increased average precision and rendering easy modifications of the thickness of the slices produced.

The concept of in situ cutting therefore permits responding to the new requirements of technology by avoiding a long and meticulous operation whilst improving the quality of performance both as to geometry and as to productivity.

Re-machining after wear, or changing the interval of the grooves for modification of the thickness of the slices, is thus rendered possible. Dismounting is needed only for the operation of replacing the coating. The in situ cutting mechanism can be integrated into the structure of the sawing device or added and/or if desired removable.

This sawing technique which requires complete control of the position of the grooves cut on the surface of the wire guide cylinders, results in the precision of the position of these latter being increased by the fact that the in situ cutting avoids the transfer of the wire guide cylinders from an external cutting machine to the sawing device and hence undesirable cumulative error of positioning.

The in situ cutting mechanism will therefore be in the form of a cutting tool which can as well be a grinding wheel as a cutting tool such as a graver mounted on a tool-carrying carriage and which can move along one or two independent axes. These motorized movements are controlled in amplitude by numerical control, independent or associated with that of the sawing device. The programming of this latter will depend on the geometry of the grooves. There could also be used the movement of the support table of the piece to be sawed as one of the axes of the cutting mechanism. As the sawing device comprises several wire guide cylinders, each wire guide can have its own in situ cutting mechanism. The system can also be a single one, but movable from one wire guide cylinder to another.

Other advantages will appear from the characteristics set forth in the dependent claims and from the description hereafter of the invention in greater detail with the help of the drawings which show schematically and by way of example two embodiments.

Figure 1A:
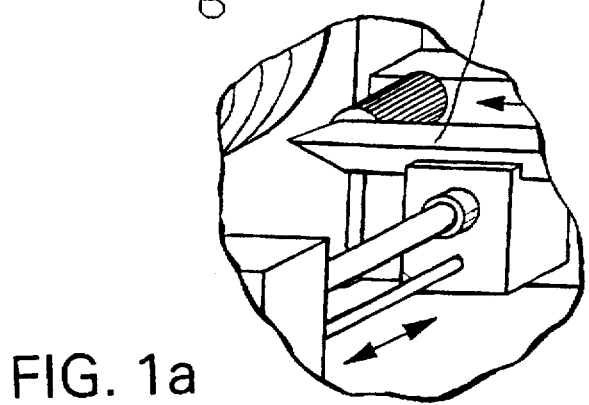
Figure 2:
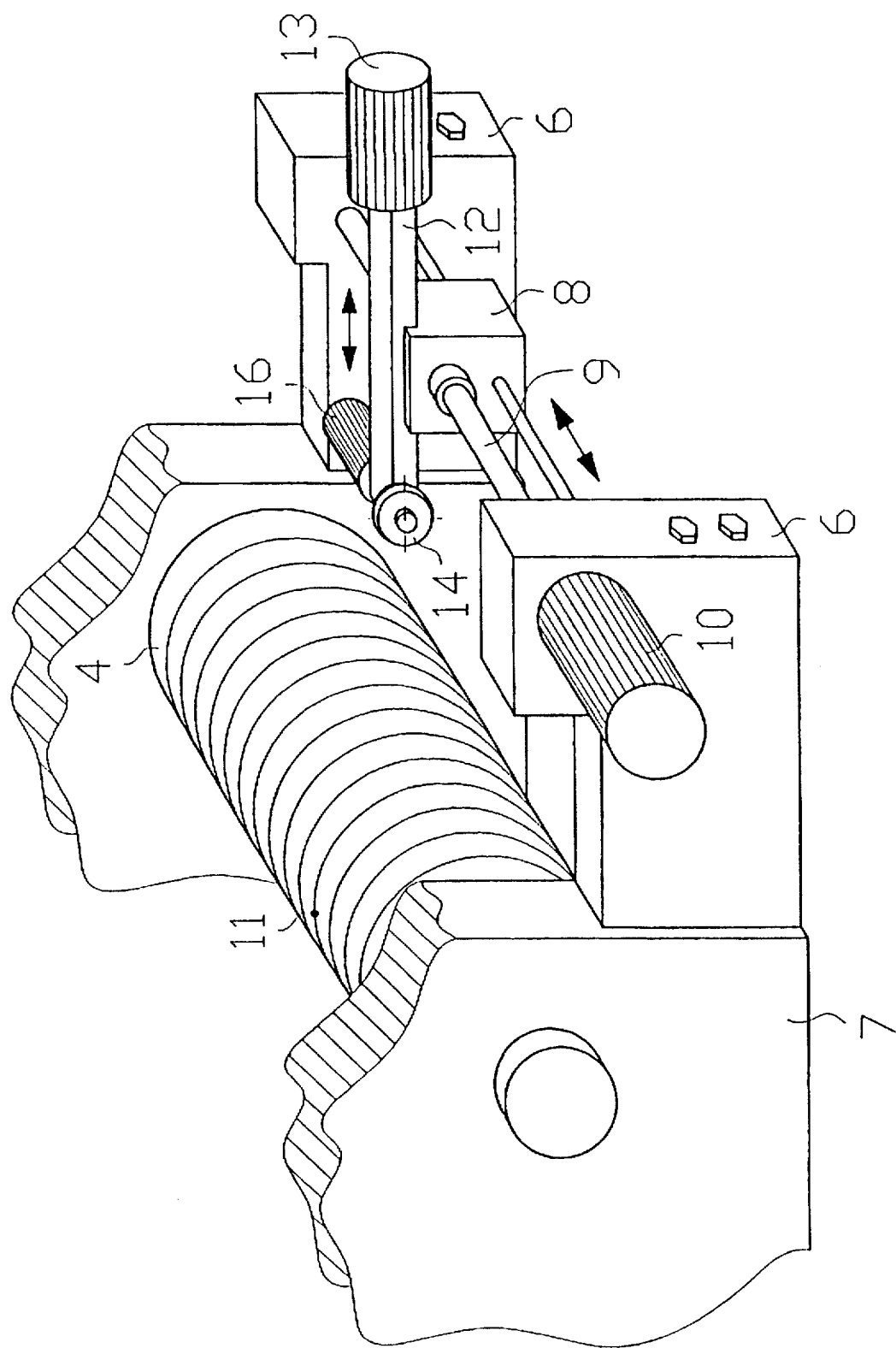
Figure 3:
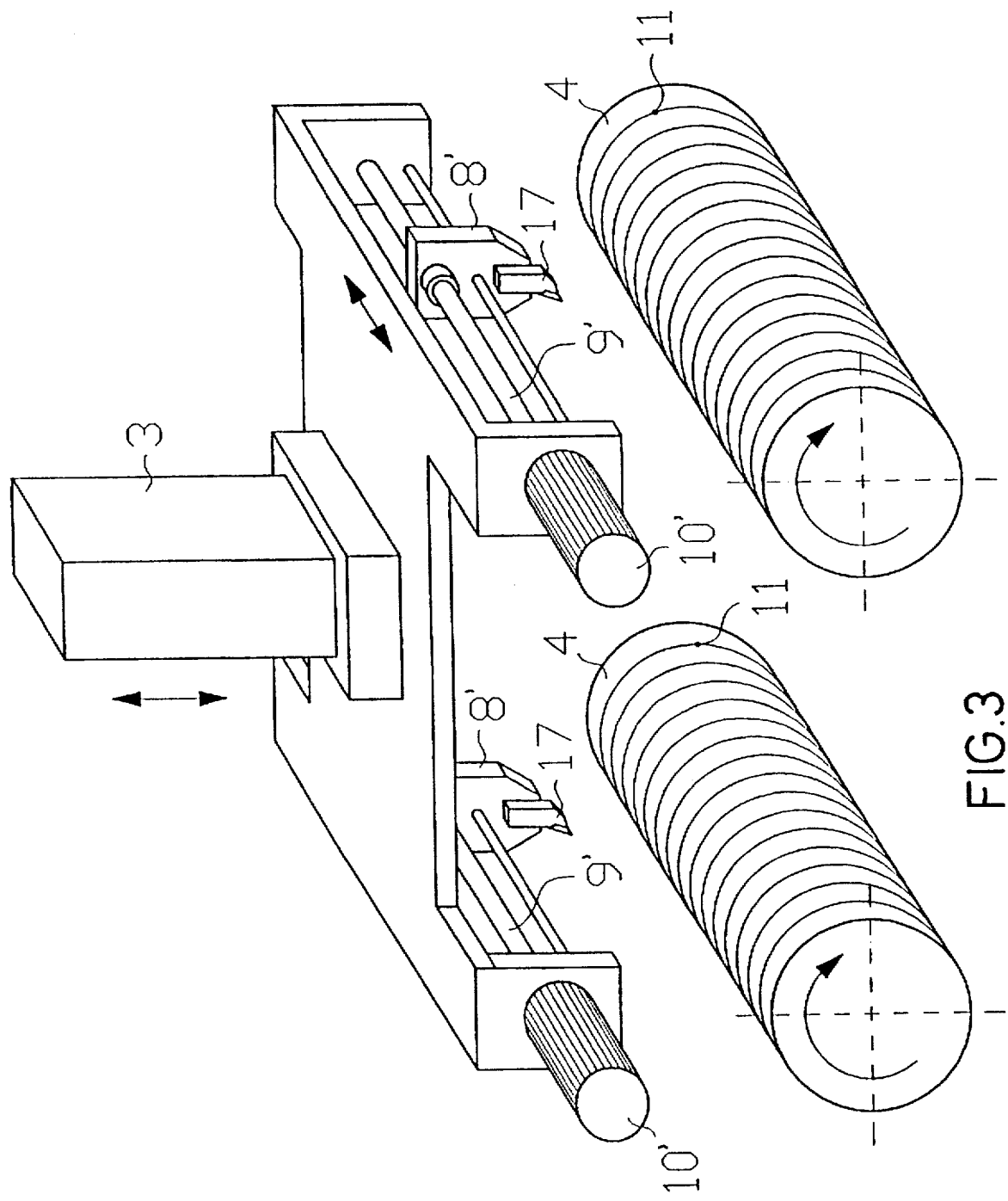

FIG. 1 is a perspective view showing a first embodiment.
FIG. 1a shows an alternative cutting tool.
FIG. 2 is an enlarged view of a portion of FIG. 1.
FIG. 3 shows a second embodiment.

Referring to FIGS. 1 and 2, a piece 1 to be sawed is placed in bearing relationship against a layer of wires 2 supported by wire guide cylinders 4. A support table 3 on which is secured the piece 1 to be sawed is moved by a motor 15. The wire guide cylinders 4 are supported at their ends by bearings 5. A removable cutting mechanism is comprised by two supports 6 fixed against a frame 7 of the sawing device, a carriage 8 moving parallel to the wire guide cylinders 4 on a guiding axle 9 with an advancing motor 10 giving the interval between the grooves 11, a translation member comprising a second displacement axle 12 giving the depth of the grooves 11 actuated by a motor 13 and a cutting tool in the form of a grinding wheel 14 located at the end of this second axle 12 driven by the motor 16.

The layer of wires 2 is stretched between the two wire guide cylinders 4 and maintained in position by the grooves 11 cut in the surface of the cylinders 4 to define precisely the interval between the wires of the layer and hence the thickness of the sawed wafers.

The second embodiment shown in FIG. 3 comprises a cutting mechanism fixed on the support table 3. This latter is hence utilized as a translation member and second displacement axle giving the depth of the grooves 11 on the periphery of the wire guide cylinders 4. The illustrated mechanism permits the cutting of the grooves 11 in two wire guide cylinders 4 at a time. Each side is comprised by a carriage 8 moving parallel to the wire guide cylinders 4 on a guide axle 9 with an advancing motor 10 giving the interval between the grooves 11. The tool, in this case a graver 17, is located on the carriage 8 and the depth of the grooves 11 is given by the vertical movement of the ingot support table 3. The cutting speed is determined by the speed of rotation of the wire guide cylinders 4.

The wire saw forming the layer of wires 2 between the wire guide cylinders 4 is of spring steel of a diameter comprised between 0.1 and 0.2 mm so as to saw the blocks of hard or exotic materials (as such silica, ceramic, compounds of Groups III-V, gadolinium-gallium garnet, sapphire, etc.) in slices of about 0.1 to 5 mm thickness. The abrasive agent is a commercial product and can be diamond, silicon carbide, alumina, etc. and in the form fixed to the wire or free with the wire passing therethrough.

The sawing device permits by its in situ cutting principle forming grooves 11 on the surface of the wire guide cylinders 4, thereby to obtain maximum performance, productivity or flexibility, without detriment to the quality of the slices produced.

Of course the embodiments described above are in no way limiting and can be the subject of any desirable modifications within the scope as defined by claim 1. In particular, other types of in situ cutting systems can be envisaged which by their manner of machining have also the function of cutting without dismounting the wire guide cylinders 4.

The cutting mechanism could be integrated into the structure of the sawing device or could be removable. In this latter case, the cutting mechanism could be mounted on a transport vehicle and service for example several sawing devices.

Cutting tools of all types could be used, such as abrasive devices, or cutting tools. Other cutting tools 14a (FIG. 1a) may also be use. Cutting without removal of material, by rolling for example, could also satisfy the in situ cutting and hence the object of the present invention. By way of further example, the cutting mechanism could also use, for the formation of grooves 11, the principles of machining by laser, by liquid jet, for example water jet, by electro-erosion or even by acid engraving.

The whole cutting mechanism or at least a portion of it comprising the cutting tool or tools could be arranged in a position intermediate the wire guides 4 such that the cutting takes place on one sector of the wire guide cylinders not covered by the layer of wires. The re-cutting of the grooves could thus take place without removing the wires from the cylinders 4. These latter could be 2, 3, 4, or even more in number.

I claim:

1. Wire sawing device comprising: a layer of wires (2) stretched between at least two wire guide cylinders (4) and maintained in position by grooves (11) on the surface of said wire guide cylinders (4) which define the interval between the wires of said layer (2); a support table (3) for carrying a piece to be sawed; and a cutting mechanism for in situ cutting of the grooves (11) in the surface of the wire guide cylinders (4) without dismounting the wire guide cylinders (4).

2. Device according to claim 1, wherein the cutting mechanism is integrated into the structure of the sawing device.

3. Device according to claim 1, wherein the cutting mechanism is removable.

4. Device according to claim 1 wherein the cutting mechanism is removable and fixed on a transport vehicle.

5. Device according to claim 1, wherein the cutting mechanism comprises at least one support (6), at least one carriage (8) adapted to move parallel to the wire guide cylinders (4) on a guide axle (9) and carrying at least one cutting tool (14, 17) adapted to be urged against at least one wire guide cylinder (4) by a translation member (13, 3).

6. Device according to claim 1, wherein the cutting mechanism is provided with an abrasive disc (14) for a cutting tool.

7. Device according to claim 1, wherein the cutting mechanism is provided with a cutting tool (17) and the speed of cutting is given by a speed of rotation of the wire guide cylinders (4).

8. Device according to claim 7, wherein the cutting mechanism uses as a translation member the support table (3) to urge the cutting tool against at least one wire guide cylinder (4).

9. Device according to claim 1, wherein the cutting mechanism comprises means for rolling for the formation of the grooves (11).

10. Device according to claim 1, wherein the cutting mechanism comprises means for the formation of the grooves (11) by one of laser machining, liquid jet, electro-erosion and acid engraving.

11. Device according to claim 1, wherein at least one portion of the cutting mechanism comprises a cutting tool arranged in a position intermediate the wire guide cylinders (4) such that cutting takes place on a sector of the wire guide cylinders (4) not covered by the layer of wires (2).

* * * * *